United States Patent [19]

Adkins

[11] Patent Number: 4,858,636
[45] Date of Patent: Aug. 22, 1989

[54] PRESET MICROSCOPIC FLOW VALVE APPARATUS AND METHOD

[76] Inventor: Donald E. Adkins, P.O. Box 217, San Simon, Ariz. 85632

[21] Appl. No.: 193,113

[22] Filed: May 11, 1988

[51] Int. Cl.⁴ ............................................. G05D 7/01
[52] U.S. Cl. ...................... 137/8; 137/68.1; 137/497; 137/599; 251/117
[58] Field of Search ................ 137/599, 68.1, 601, 137/8, 497; 405/39, 40; 138/44; 251/117

[56] References Cited

U.S. PATENT DOCUMENTS

| | | | |
|---|---|---|---|
| 2,150,077 | 3/1939 | Oehler | 137/599 |
| 2,229,903 | 1/1941 | Schmohl et al. | 137/599 |
| 2,821,210 | 1/1958 | Liley | 137/599 |
| 3,062,410 | 11/1962 | Schwieger | 137/599 X |
| 3,298,367 | 1/1967 | Bergman | 137/599 X |
| 3,470,893 | 10/1969 | Nelson | 137/68.1 |
| 3,746,041 | 7/1973 | Friedland | 137/601 X |
| 3,767,124 | 10/1973 | Spencer | 239/542 |
| 3,814,377 | 6/1974 | Todd | 405/39 X |
| 3,968,930 | 7/1976 | Hendrickson | 239/107 |
| 4,008,853 | 2/1977 | Tregillus | 239/542 |
| 4,098,296 | 7/1978 | Grasso et al. | 137/855 |
| 4,143,820 | 3/1979 | Bright, Sr. | 239/108 |
| 4,223,838 | 9/1980 | Vittorio-Torrisi | 239/109 |
| 4,331,293 | 5/1982 | Rangel-Garza | 239/542 |
| 4,420,009 | 12/1983 | Sharp et al. | 137/599 X |
| 4,456,223 | 6/1984 | Ebling | 137/599 X |

FOREIGN PATENT DOCUMENTS 1020083  5/1983  U.S.S.R. .................. 405/39

*Primary Examiner*—Stephen M. Hepperle
*Attorney, Agent, or Firm*—Victor Flores; Harry M. Weiss

[57] ABSTRACT

A pressure-compensating, self-flushing, preset flow valve utilizing an emitter for maintaining a continuous microscopic flow of water at a specified continuous rate. The valve includes a housing adapted with an inlet chamber and an outlet chamber and a preset emitter device encapsulated between the inlet and outlet chamber having selectively unplugged outlet ports each capable of delivering a preset microscopic volume of water into the outlet chamber for collective distribution to a moisture maintenance system. The valve housing is adapted with inlet and outlet ports for connecting to a water source and a moisture maintenance system, respectively. In an alternative embodiment the housing may be modified to provide multiple stages of the encapsulated preset emitter device such that each stage is preset for a flow rate for selectively utilization according to seasonal needs.

7 Claims, 1 Drawing Sheet

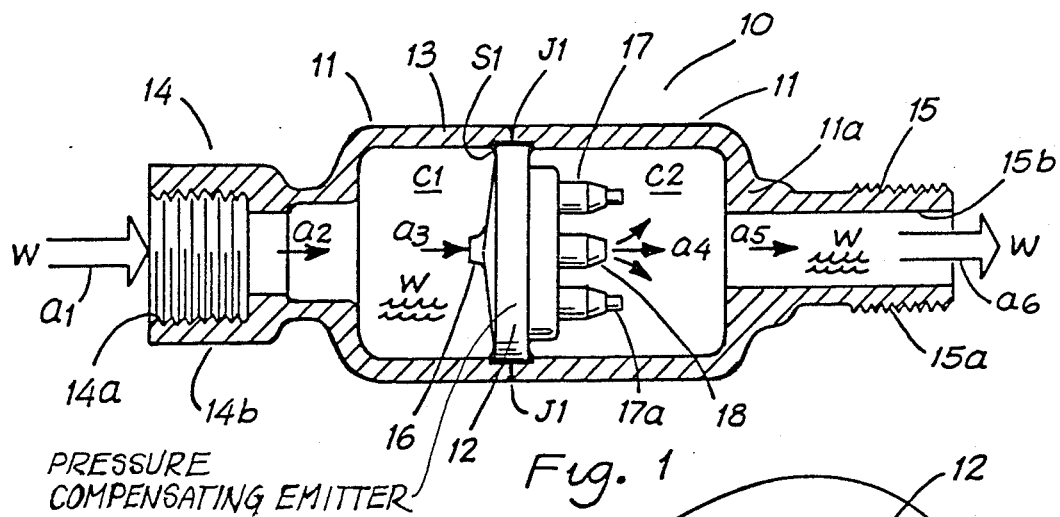
PRESSURE COMPENSATING EMITTER
Fig. 1
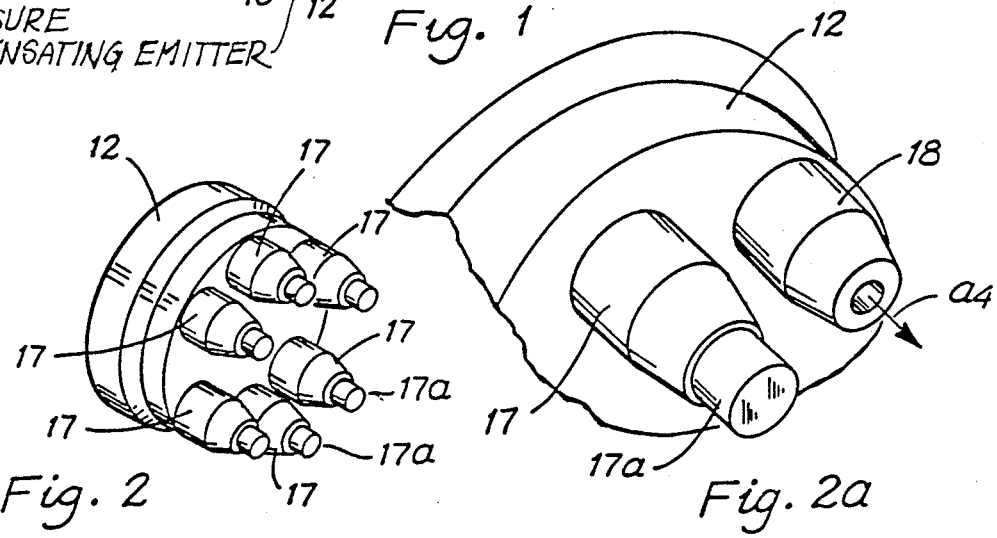
Fig. 2
Fig. 2a
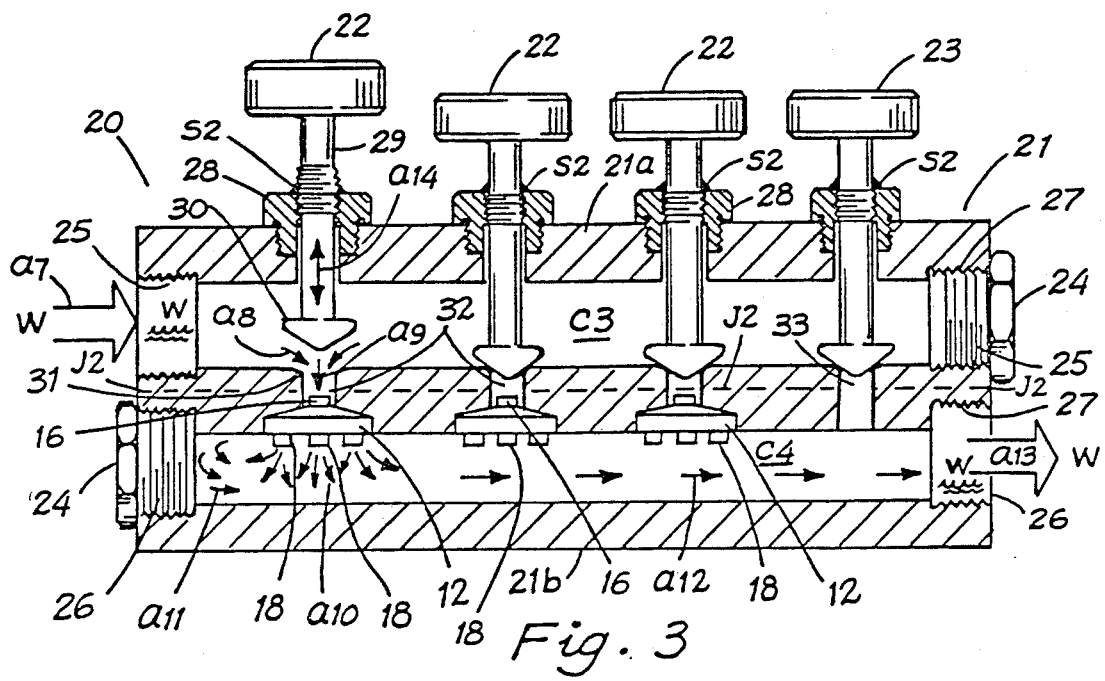
Fig. 3

PRESET MICROSCOPIC FLOW VALVE APPARATUS AND METHOD

FIELD OF THE INVENTION

This invention relates to water valves. More particularly, the invention relates to pressure-compensating, self-flushing, preset flow valves that connect to moisture maintenance systems, preferably subsurface moisture systems, that require continuous water flow at a preset flow rate. The apparatus is adapted with at least one preset emitter housed having selectively unplugged outlet ports that deliver water to a distribution chamber within a main valve housing for collective distribution to a moisture maintenance system. The valve is provided in a single stage or multiple stage valve arrangements for selectively utilization according to seasonal plant moisture needs.

DESCRIPTION OF THE PRIOR ART

Emitter devices used in drip or trackle irrigation, are well known and have been used successfully to conserve on water resources. However, recent developments in subsurface irrigation systems which utilize water permeating pipes, require flow rate control designed for the actual moisture needs of plants at the root zone. The permeating, saturated membrane functions on the principles of capillary attraction and is deemed to conserve more on water resources than emitters delivering water for drip to target surface areas because the moisture distribution is at the root zone. The present emitters, although possessing certain attributes such as self-flushing, pressure-compensating, are deemed to be incompatible from a hydraulic coupling and flow rate selection standpoint for use with moisture maintenance systems employing water permeating pipe.

Typical of emitter devices which have been patented include, U.S. Pat. No. 3,767,124 to Spencer which teaches a self-flushing irrigating valve having a plurality of distributor ports. Although the valve is adapted to be self-flushing and pressure-compensating and to deliver a particular flow rate through each distributor port, selective and collective use of the outputs is not possible.

Other emitters patented include U.S. Pat. No. 4,143,820 to Bright, Sr. which teaches an emitter for drip irrigation comprising a cylindrical body, all being insertable within apertures in a pipe wall. U.S Pat. No. 4,223,838 to MariaVittorio-Torrisi teaches an emitter for use in drip irrigation comprising a tubular casing having a cap end for receiving lateral water line ends. U.S. Pat. No. 4,331,293 to Rangel-Garza teaches an emitter having a rod extending from a male section into a passageway to provide restricted passagse of fluid so as to impede the passage of particles in a cyclone-like action in series with a pressure compensation mechanism. U.S. Pat. No. 4,008,853 to Tregillus teaches an emitter adapted for drip irrigation having a self-purging and pressure responsive means. The pressure responsive means includes a plurality of valve lips which are used to maintain a constant flow rate.

Moisture maintenance systems that employ permeating pipes for providing moisture to plants at the root zone, according to plant seasonal needs, require a preset flow valve that can deliver low, micorscopic volumes of water, ranging from approximately one (1) to two (2) quarts per hour up to fifty (50) gallons per hour. Moisture maintenance systems employing water permeating pipes, optimized for delivering microscopic volumes of water to plant root zones in large square areas, including commercial landscaping, residential lawns and gardens, rather than a single plant target area, require valves that can be hydraulically coupled and which can deliver a continuous, microscopic water flow rate. The presently known emitters, while suitable for surface target drip irrigation, are limited in design for incremental and collective utilization of the typically provided outlet ports, such as that needed by the optimized moisture maintenance systems. Therefore, a need is seen to exist for a preset flow valve which will meet the needs of these optimized moisture maintenance systems.

SUMMARY OF THE INVENTION

Accordingly, the present invention has as a primary objective of providing a pressure-compensating, self-flushing, preset flow valve utilizing a multi-outlet port emitter for presetting a continuous microscopic flow of water at a specified continuous rate. The valve includes a housing adopted with a chamber for encapsulating an emitter that has the outlet ports preset for a predetermined water flow rate prior to encapsulation. The housing is adapted with inlet and outlet ports for connecting to a water source and to a moisture maintenance system, respectively. Another object of the invention is to extend the attributes of the single stage emitter valve to an alternative embodiment having a housing modified to provide multiple stages of the encapsulated emitters such that each stage is preset for a preset flow rate for selectively utilization according to seasonal needs.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 1 is a sectioned view of a single stage preset flow valve illustrating an emitter in a housing receiving water at an inlet port and discharging water into an outlet chamber from a selected unplugged outlet port.

FIG. 2 is an enlarged perspective view of an emitter as employed in the present invention illustrating multiple outlet ports with plugs.

FIG. 2a is a fragmented enlarged view of an emitter illustrating a selected outlet port with plug removed.

FIG. 3 is a sectioned view of a seasonal valve illustrating having multiple stages of preset emitters within a housing and being controlled by associated valve open/close stems, also illustrated is a flushing port with associated open/close stem.

DESCRIPTION OF THE PREFERRED EMBODIMENT

In a more detailed explanation of the invention, reference is now made to the preferred embodiment shown in the figures wherein, FIG. 1 shows a cross section of a single stage preset flow valve 10 adapted with a housing 11 for encapsulating an emitter 12. Housing 11 is comprised of a body portion 13 forming inlet water chamber C1 and outlet water chamber C2. The housing is adapted with an inlet portion 14 and an outlet portion 15. The preferred material 11a for constructing the housing is PVC plastic commonly used in pipe fittings.

In the embodiment of the single stage preset valve 10, emitter 12 is positioned within body portion 13 having a thermoset junction J1 between chamber C1 and C2 and thereat fixedly sealed at S1 using an O-ring or similar device. As best seen in FIGS. 1, 2 and 2a, the emitter 12 is shown having an emitter inlet 16 and a plurality of outlet ports 17. Each of the outlet ports 17 are provided with plug 17a which are used in the pre-selection of a flow rate prior to encapsulation within housing 13, resulting in an open outlet port 18. The encapsulated emitter 12 is designed to receive water W according to flow arrow a1 by attaching a suitably fitted hose to threaded bore 14a or to external slip coupling 14b of inlet portion 14. Water then flows in the direction of flow arrow a2 into inlet chamber C1 for being forced into emitter inlet 16. Then, depending on flow rate needs and preselected number of ports, water continues flowing into outlet chambers C2, according to flow arrow a4. Outlet chamber C2 allows collective delivery of incremental water flow rates of the emitter depending on the number of outlet ports preselected by being unplugged. The collected water W being delivered, according to flow arrows a5 and a6, collectively represents, a controlled preselected water flow rate according to the flow rate design of a single emitter outlet port up to the total capacity of all provided emitter outlet ports. The outlet portion 15 is attachable to a moisture maintenance system suitably provided for attaching to externally threaded end 15a or to internal slip coupling 15b.

In accomplishment of another object of the invention a seasonal valve 20 extends the features of a single encapsulated emitter to several emitters 12. The multiple emitter stage valve functions in the same manner as the single emitter stage valve, except that the water flow to emitter ports 16 can be individually controlled by stems 22. Additionally, valve 20 is provided with a flushing port 33 controlled by flush stem 23. Each of the emitters 12 can have any combination of unplugged emitter outlet ports 18 to achieve the seasonal moisture needs being supplied by the moisture maintenance system.

Structurally, the seasonal valve 20 is comprised of a housing 21 having an upper housing 21a and a lower housing 21b, forming inlet chamber C3 and outlet chamber C4. Upper and lower housing sections 21a and 21b are joined, as by using a thermoset method, along joint J2, having, in a laterally spaced relationship, emitters 12 embedded in line with internal chamber-to-chamber ports 32. Stems 22, having shaft 29, operate in the direction of arrow a14 to position stem seat 30 onto chamber-to-chamber port seat 31 to either cause water W to flow according to arrow a7 to any of the provided emitter stages, typically as shown by flow arrows a8 and a9 into emitter inlet port 16, or to close the chamber-to-chamber port 32. When stems 22 are in an open position, allowing water W to flow into chamber C4, water can flow out of the valve as shown by arrows a11, a12 and a13 to a moisture maintenance system. The stems 22 are mounted in upper housing 21a using a threaded valve stem receiver 28 and sealed by seal member S2. The embodiment illustrated in FIG. 3 shows dual inlets 25 and dual outlets 26, having one of the inlets and one of the outlets plugged with plugs 24 using internal threads 27.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope fo the claims so as to embrace any and all equivalent apparatus.

I claim:

1. A preset flow rate valve apparatus having water pressure compensating means for maintaining a constant water volume flow rate during periods of variable inlet pressures and flushing means for clearing foreign debris within flow passageways, for use in moisture maintenance systems, said valve apparatus comprising:
   (a) valve housing means for coupling to a water source and delivering microscopic volumes of water, said valve housing means having a first housing member and a second housing member, said first housing member forming an inlet chamber and said second housing member forming an outlet chamber; and
   (b) at least one emitter means, said emitter means being fixedly positioned and sealed between said inlet and outlet chambers, said emitter means having a housing with an inlet port and a plurality of outlet ports designed to deliver microscopic volumes of water at a rate ranging from one quart per hour to fifty gallons per hour, each outlet port being designed to provide a fractional preset flow rate, said plurality of outlet ports include unused outlet ports having closed orifices and useable outlet ports having opened orifices that are selectively opened prior to said emitter means being fixedly positioned between said inlet and outlet chambers.

2. A preset flow rate valve apparatus as recited in claim 1 wherein:
   (a) said inlet chamber being designed for containing water at substantially high pressures and providing an inlet water source to said inlet port of said emitter means, said useable outlet ports discharging said preset water volume into said outlet chamber;
   (b) said first housing member having at least one valve inlet port adapted for connecting to said water source; and
   (c) said second housing member having at least one valve outlet port adapted for connecting to an irrigating system.

3. A preset flow rate valve apparatus as recited in claim 2, wherein said housing means further includes:
   (a) a flushing port located between said inlet chamber and said outlet chamber;
   (b) a shut-off means for opening and closing the flow of water to said at least one emitter means; and
   (c) a shut-off means for opening and closing water flow to said flushing port.

4. A preset flow rate valve apparatus having water pressure compensating means for maintaining a constant water volume flow rate during periods of variable inlet pressures, for use in moisture maintenance systems, said valve apparatus comprising:
   (a) valve housing means for coupling to a water source and delivering microscopic volumes of water, said valve housing means having a first housing member and a second housing member, said first housing member forming an inlet chamber and said second housing member forming an outlet chamber, said first housing member having at least one valve inlet port adapted for connecting to said water source and said second housing member having at least one valve outlet port adapted for connecting to an irrigating system;

(b) a flushing port located between said inlet chamber and said outlet chamber;

(c) a shut-off means for opening and closing water flow to said flushing port;

(d) at least one emitter means, said emitter means being fixedly positioned and sealed between said inlet and outlet chambers, said emitter means having a housing with an inlet port and a plurality of outlet ports designed to deliver microscopic volumes of water at a rate ranging from one quart per hour to fifty gallons per hour, each outlet port being designed to provide a fractional preset flow rate, said plurality of outlet ports including unused outlet ports having closed orifices and useable outlet ports having opened orifices that are selectively opened prior to said emitter means being fixedly positioned between said inlet and outlet chambers; and (e) shut-off means for opening and closing the flow of water into said inlet port of said at least one emitter means.

5. A method of delivering microscopic volumes of water using a moisture maintenance systems, comprising the steps of:

(a) providing a preset flow rate valve apparatus having a water pressure compensating means for maintaining a constant water volume flow rate during periods of variable inlet pressures, said valve apparatus comprising:

(i) valve housing means for coupling to a water source and delivering microscopic volumes of water, said valve housing means having a first housing member and a second housing member, said first housing member forming an inlet chamber and said second housing member forming an outlet chamber, and (ii) at least one emitter means, said emitter means being fixedly positioned and sealed between said inlet and outlet chambers, said emitter means having a housing with an inlet port and a plurality of outlet ports designed to deliver microscopic volumes of water at a rate ranging from one quart per hour to fifty gallons per hour, each outlet port being designed to provide a fractional preset flow rate, said plurality of outlet ports include unused outlet ports having closed orifices and useable outlet ports having opened orifices that are selectively opened prior to said emitter means being fixedly positioned between said inlet and outlet chambers;

(b) coupling said valve housing to a water source;

(c) pressurizing said inlet chamber with water from said water source;

(d) inputting said pressurized water into said inlet port of said at least one emitter means;

(e) outletting a preset microscopic volume of water from said outlet ports having opened orifices into said outlet chamber;

(f) reservioring said microscopic volume of water in said outlet chamber; and (g) delivering said reserviored volume of water at a preset flow rate from said microscopic volume rate range.

6. A method of delivering micorscopic volumes of water as recited in claim 5, wherein:

said step of providing a preset flow rate valve apparatus includes providing a preset flow rate valve apparatus having a flushing port located between said inlet chamber and said outlet chamber and a shut-off means for opening and cleaning water flow to said flushing port; and said method further includes the step of opening said flushing port shut-off means for flushing water in said inlet chamber through said flushing port into said outlet chamber.

7. A method of delivering microscopic volumes of water as recited in claim 5, wherein:

said step of providing a preset flow rate valve apparatus includes providing a preset flow rate valve apparatus having a plurality of said at least one emitter means fixedly positioned and sealed between said inlet and outlet chambers and a plurality of shut-off means for opening and closing the flow of water into respective inlet ports of said plurality of said at least one emitter means; and said method further comprising the step of controlling the flow of water into said respective inlet ports by using said plurality of shut-off means.

* * * * *

UNITED STATES PATENT AND TRADEMARK OFFICE
CERTIFICATE OF CORRECTION

PATENT NO. : 4,858,636
DATED : AUGUST 22, 1989
INVENTOR(S) : DONALD E. ADKINS

It is certified that error appears in the above-identified patent and that said Letters Patent is hereby corrected as shown below:

In Claim 6 line 7, after "opening and" delete "cleaning" and insert therefor --closing--.

Signed and Sealed this

Third Day of July, 1990

Attest:

HARRY F. MANBECK, JR.

Attesting Officer

Commissioner of Patents and Trademarks